United States Patent Office 3,642,976
Patented Feb. 15, 1972

3,642,976
SOLID PHASE, HYDROSTATIC EXTRUSION OF A FILLED THERMOPLASTIC BILLET TO PRODUCE ORIENTATION
Alan Buckley and Christopher Cassin, Runcorn, England, assignors to Imperial Chemical Industries Limited, London, England
Filed Feb. 26, 1969, Ser. No. 802,626
Claims priority, application Great Britain, Feb. 27, 1968, 9,466/68
Int. Cl. B29f 3/014
U.S. Cl. 264—323
13 Claims

ABSTRACT OF THE DISCLOSURE

Process forming article from a thermoplastic matrix containing fillers of defined shape, particularly fibres and plate-like structures, in which both the matrix and filler are oriented in the same direction or directions. The tensile properties of the articles are improved over similar articles in which the components are unoriented. The preferred process for producing such articles is hydrostatic extrusion below the melting point of the components.

---

Figure 1:
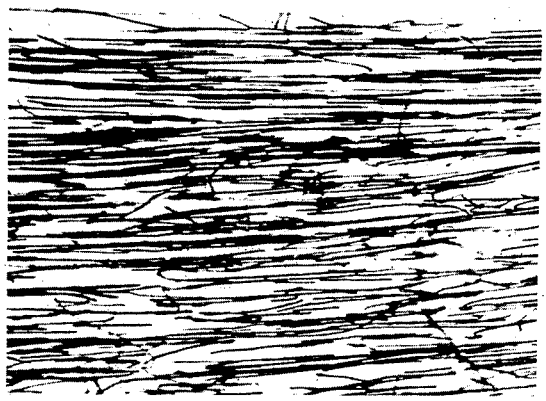

This invention relates to articles formed from reinforced thermoplastic composite materials and especially to such articles which have high modulus and strength, and to a process for producing such articles.

It is known that certain physical properties of thermoplastic materials e.g. their tensile modulus, may be increased by the incorporation of fillers, such as fibres, into the thermoplastic matrix. The composite materials so produced are known as reinforced thermoplastics.

It is also known that physical properties of thermoplastic materials may be modified by orientation of the polymer chains within the materials themselves, for example, by deformation of the materials at temperatures below their melting points.

We have now produced shaped articles derived from reinforced thermoplastics having orientation of matrix material and reinforcement.

Accordingly, one aspect of the invention comprises articles formed from a composite material comprising a matrix of orientable thermoplastic material and a filler comprising orientable property-modifying structures dispersed in the matrix, the matrix and filler both being at least partially oriented in the same direction or directions. Preferably the articles have a cross-sectional area of at least 0.01 square inch and thickness not less than 0.05 inch.

The invention is particularly directed to elongate articles in which the aforementioned orientation of matrix and filler is substantially uniaxial in a direction parallel to the major axis of the article.

Within the term "articles," as used in this specification, we include bars, strips, rods and other forms of solid stock, and tubes. The shape of articles according to our invention may be further modified provided that such subsequent modification does not adversely affect the orientation of matrix and/or filler in the bulk of the material.

The thermoplastic material which forms the matrix may be a polyolefin such as polyethylene or polypropylene, a polyamide, such as nylon 6.6, a polyaldehyde, such as polyacetal, or a polyester, such as polyethylene terephthalate. Other thermoplastic materials such as polytetrafluoroethylene may be used provided that they are capable of orientation.

By "orientable property-modifying structures" we mean structures which, when incorporated into the matrix of thermoplastic material, give rise to a material having physical properties which are modified in comparison with the physical properties of the original thermoplastic material, and which by virtue of their shape are capable of adopting a preferred angular position relative to a given axis, which requires that one or two of their dimensions must be considerably longer than the remaining one or two other dimensions. The preferred orientable property-modifying structures which may be used as the filler in the composite materials of articles according to the invention are fibres or whiskers, in which one dimension is longer than the other two, or laminar materials in which two dimensions are both longer than the remaining one.

Examples of useful fibrous fillers are glass fibres, asbestos, metal fibres, especially steel fibres, carbon fibres and ceramic whiskers, such as those formed from silicon carbide. Examples of laminar materials are mica and graphite flakes.

The degree of orientation of the matrix and filler may not be determined simultaneously using available techniques, but each may be determined independently using appropriate methods.

For example, the degree of orientation of the matrix may be determined by X-ray diffraction. Methods for achieving this are not standardised; but descriptions of suitable techniques are given in the following references:

Wilchinsky, J. Applied Polymer Science 7 (1963) 923–933,

Kasai and Kakudo, J. Polymer Science, Part A, 2 (1964) 1955–1966,

Heffelfinger and Burton, J. Polymer Science, vol. XLVII (1960) 289–306.

The orientation of the filler within the matrix may be determined using micro-radiographic techniques as generally described in "X-Ray Microscopy" by Cosslett and Nixon (1960) published by Cambridge University Press. However, when there is sufficient difference between the optical properties of the matrix and the filler, for example when steel fibres are used as filler, the orientation of the latter may be determined by visual inspection aided by the use of a microscope.

A high degree of orientation is generally desirable though achievement of a very high degree of orientation of both matrix and filler may be difficult to obtain and may even be undesirable in some circumstances. For example, very high degrees of uniaxial orientation may give rise to unacceptable weakness at right angles to the direction of orientation. In this respect the use to which the finished article is to be put may be of importance. For example, if the article is of rod form and is intended for use in situations where it is subject to uniaxial tensile stress only, a very high degree of uniaxial orientation is acceptable, whereas biaxial or triaxial stress might induce splitting or fibrillation in such a highly oriented material. The maximum acceptable degree of orientation which may be achieved without the onset of undesirable phenomena varies between different thermoplastics.

Preferred articles according to our invention have a tensile modulus which is at least 1.5 times the tensile modulus of conventionally melt-formed composite materials of the same nominal composition. The articles usually possess improved break stress, of the order of twice the value of break stress of a conventionally formed material. The articles may also possess improved extension to break and impact strength. It will be appreciated that since the articles are anisotropic, the improvements in properties will not be the same in all directions.

According to a further aspect of the invention a process for producing articles of reinforced thermoplastic composite materials comprises subjecting a billet of a substantially non-oriented blend of martix and filler materials to a solid phase extrusion process at a temperature below the melting point of both matrix and filler to cause permanent deformation of the matrix and at least partial orientation of the matrix and filler in substantially the same direction or directions.

The use of the process of our invention generally results in the production of reinforced thermoplastic articles having improved tensile properties. However, in order to obtain the optimum realisable properties from any given matrix/filler combination, several process parameters require to be carefully controlled. When such controlled conditions are used, articles having tensile moduli of at least 1.5 times that of conventionally melt-formed composite materials of the same nominal compositions, may be produced.

Optimum process conditions vary with choice of starting materials; but may be determined in accordance with principles which will be readily appreciated from the following discussion and from the examples.

The amount of permanent, i.e. non-elastic, deformation which occurs in the material is related to the orientation produced. This permanent deformation may be expressed as an "extrusion ratio" which may be defined as the ratio of the cross-sectional area of the billet to the cross-sectional area of the extrudate, the areas being measured perpendicular to the direction of deformation.

It should be noted that as a consequence of some elastic recovery of the extrudate after issuing from the die, the extrusion ratio may not be the same as the ratio of billet cross-section to die area. This latter ratio will hereinafter be referred to as the "ideal exrtusion ration"; it will be appreciated that the difference between these two ratios must be taken into account when designing apparatus to extrude articles of a given cross-sectional area. Factors affecting this difference will be discussed below and a suitable combination of these factors may reduce or even eliminate this difference.

Since extrusion according to our process is carried out at temperatures below the melting point of the constituents of the composite, it is important that the interface between the composite and exrtuder die surface is efficiently lubricated to prevent damage to the produce and to the die itself. Efficient lubrication is best achieved by the use of hydrostatic extrusion in which the forces required to cause deformation are transmitted to the material to be extruded by a pressure-transmitting fluid which also serves as a lubricant. The general technique of hydrostatic extrusion is described by Pugh and Low in "The Hydrostatic Extrusion of Difficult Metals" Journal of the Institute of Metals v. 93, pp. 201-217, 1964-5. When ram extrusion is used, auxiliary means must be applied to ensure efficient lubrication.

A generalised description of our application of the hydrostatic extrusion process will now be given: it will be appreciated that many of the process parameters which must be controlled in this process are also of importance in ram extrusion processes.

A billet of suitable size for introduction into the extruder barrel is prepared by conventional techniques, for example by melt blending of the filler with the matrix material followed by solidification and shaping by a moulding or extrusion process. It is important that the filler is evenly distributed throughout the matrix and that the matrix material itself is substantially homogenous i.e. it should be free from variations in density throughout its mass. It should also be free from voids. If such conditions are not met the extrudate may be uneven, blistered and may contain zones of weakness.

Many of the fillers which may be used with benefit are themselves substantially brittle and incapable of plastic deformation at the temperatures and strain rates used in our preferred process. Hence the permanent deformation produced during extrusion occurs in the matrix only. Consequently the concentration of filler which may be incorporated in the composite must not exceed the level at which voids are introduced into the material. Generally, up to 40% by volume is suitable.

It is advantageous to form the end of the billet nearest the die to such a shape that it forms a reasonably fluid-tight seal with the die to prevent loss of hydrostatic fluid when extrusion is commenced. The die orifice cross-section is of course selected according to the shape of product required. The billet is inserted into the extruder barrel, and the hydrostatic fluid is introduced. The hydrostatic fluid is selected on the basis of its ability to lubricate metal-thermoplastic interfaces, its limited compressibility and limited temperature dependence of compressibility. It will be appreciated that the lubricant must not interact with the thermoplastic matrix material in a way which will adversely affect the properties of the product. Most hydraulic oils are suitable and silicon oils are particularly useful.

Before extrusion is commenced, the whole of the billet and die should be heated to a substantially constant temperature. Unless care is taken to eliminate regions of variable temperature within the billet uneven extrusion may occur and the extrusion velocity may be difficult to control. For example, if the billet temperature is higher than the die temperature the end of the billet brought into contact with the die will be cooled so that when extrusion is commenced, the higher pressure neded to initiate extrusion of the cooled end of the billet will be greater than the pressure needed to maintain a steady rate of extrusion of the main part of the billet. The result may be a very rapid and uncontrollable extrusion of the remainder of the billet.

The actual temperature used for extrusion depends mainly upon the thermoplastic material used for the matrix; but factors such as the extrusion ratio, the desired speed of extrusion and the size of the product required also affects the choice of temperature.

For polypropylene, temperatures from ambient up to 140° C. may be used. Use of the higher temperatures in this range allows reduction of the pressure required to cause extrusion; but at tempertures above 120° C., product properties begin to fall below optimum. The best products in terms of tensile properties are obtained at about 90–110° C. It should also be noted that the actual extrusion ratio approaches closer to the ideal extrusion ratio at these preferred temperatures. Nylon 66 is not as susceptible as polypropylene to variations in product properties with extrusion temperature, and thus, temperatures in the range 100 to 200° C. may be conveniently used for filled polyamides.

Polyesters, e.g. polyethylene terephthalate may be extruded in the range from 100 to 200° C. whereas for polyaldehydes, e.g. the optimum extrusion temperature is about 120° C.

Ambient temperature is suitable for polyethylene.

The various factors affecting the choice of extrusion ratio will now be discussed.

Extrusion of filled thermoplastic materials may be carried out, for most the commoly available thermoplastics, in the range of ideal extrusion ratios from 2:1 to 8:1, although for a given thermoplastic material only part of this range may be fully useable. In some cases the use of ratios higher than 6:1 requires excessive pressures, which may be beyond the capabilities of available extrusion machines. Even if extrusion at such ratios can be achieved, the product may fracture or be subject to excessive relaxation as it emerges from the die. Generally therefore an extrusion ratio of 6:1 is the practical upper limit.

The lower limit is determined by whether or not the desired improvement in properties is obtained, but all properties may not vary regularly with extrusion ratio. Thus, for polypropylene fracture stress improves steadily over a range of ideal extrusion ratios from 2:1 to 6:1, whereas tensile modulus may be slightly lowered after extrusion at a ratio of 2:1 or 3:1 but is improved from 4:1 up to at least 6:1. A ratio of about 4.5:1 to 6:1, optimally about 5.5:1 appears to give the best results for filled polypropylene.

A similar effect is noted in connection with filled nylon 6.6. Tensile modulus is a minimum at a ratio of 2:1 (though the reduction in modulus is quite small) and rises rapidly up to a ratio of 4:1 when increasing the ratio further does not have a proportionally advantageous effect. Tensile fracture stress increases steadily from ratios of 2:1 up to 4:1 and falls slightly at a ratio of 5:1.

The tensile properties of poly(ethylene terephthalate) increases steadily up to an ideal extrusion ratio of about 4:1 though above this level (e.g. at a ratio of 5:1) only yield stress is improved.

It will therefore be appreciated that in order to select the optimum ideal extrusion ratio for a given material, consideration will also have to be given to the intended use of the product.

Taking into account also the various factors which affect relaxation of the product after exrusion, it will be understood that some trial experiments will be necessary to select the optimum conditions for the extrusion of a given composite material to produce an article of a desired final size.

During extrusion, it is advantageous to maintain the extruded product under tensile stress as it emerges from the extruder die. In the absence of such stress, a perfectly straight product may not always be obtained. The actual stress required is quite small compared with the extrusion force: typically 10–100 pounds per square inch may be used; but the use of higher stresses, say, 1000 pounds per square inch, is not disadvantageous. It may be noted that with higher stresses, the actual extrusion ratio approaches more closely to the ideal since it is found that the application of tension reduces the amount of relaxation that occurs as the extrudate emerges from the die. The magnitude of this effect is not great as will be seen from the following results obtained from the hydrostatic extrusion of polypropylene at an ideal extrusion ratio of 3:1. With no applied tensile stress the actual extrusion ratio was 2.36; at a stress of 15 pounds per square inch the ratio was 2.375, and at stresses of 248 and 1000 pounds per square inch the actual extrusion ratios rose to 2.47 and 2.61 respectively.

Tension may advantageously be applied to the extrudate when it is known that the billet contains minor inhomogeneities, in order to reduce distortion of the product.

The velocity with which the product is extruded should be controlled in order to prevent complete ejection of the billet from the extruder, velocity control being aided by attention to even temperature control as described above. Generally extrusion velocities in the range 20–200 inches per minute are preferred. There is no disadvantage, other than slowness, in using velocities below this figure, but very high velocities may result in fracture of the product, since there is a risk that the lubricant film may break down. It is often noted that using a lower extrusion velocity, the actual extrusion ratio approaches closer to the ideal extrusion ratio.

For some applications, it may be advantageous to reduce the degree of orientation of the surface layers of article according to our invention, since slight surface scoring, which may occur during extrusion or at any time in the service life of the article may drastically reduce its impact strength. A suitable reduction of this degree of orientation is readily achieved by briefly heating the surface layer up to or slightly above the melting point of the thermoplastic matrix.

The invention will now be illustrated by the following examples.

EXAMPLE 1

A cylindrical section billet of glass-fibre filled polypropylene was melt-formed with 8% by volume (20% by weight) of glass fibre. One end of the billet was chamfered to form a seal with the inlet face of a 0.3 inch diameter die of an extrusion apparatus. The billet cross-sectional area was 5.5 times greater than the die area. The billet was introduced into the cylinder of the extrusion apparatus which was filled with hydraulic oil and sealed. The temperature of the apparatus and billet was increased to 100° C. and allowed to stabilise. Hydrostatic extrusion was started by the application of a pressure of 5.2 tons per square inch (11,650 pounds per square inch).

The mechanical properties of the extruded material were evaluated and for comparison, the same test programme was applied to a sample of the unextruded material. For tensile testing, specimens were turned to the shape defined for rod specimens in method of test ASTM D638–61T, 1962. The test results are summarised in the following table. These tests were conducted at 20° C. at a constant strain rate of $1.67 \times 10^{-3}$ sec.$^{-1}$ up to a strain of 2½%. At this stage the strain rate was increased to $1.67 \times 10^{-2}$ sec.$^{-1}$ until break. Results are given in the table below.

TENSILE TEST RESULTS OF GLASS FIBRE FILLED POLYPROPYLENE

| Mechanical parameter [1] | Modulus (secant at 0.2% strain), p.s.i. | Break stress, p.s.i. | Break strain, percent | Yield stress (0.1% strain offset), p.s.i. |
|---|---|---|---|---|
| A. Conventionally melt-formed | $4.08 \times 10^5$ | 4,340 | 3 | 2,080 |
| B. As above after non-melt hydrostatic extrusion | $1.14 \times 10^6$ | 25,900 | 12 | 6,000 |

[1] As defined in the Appendix to ASTM D638–61T, 1962.

The results quoted show clear improvements in all the parameters quoted above. Since both the stress and strain at break have been increased, a substantially greater (approx. 20 times) energy imput is required to break a given specimen. It is also of interest to note that the high value of the 0.1% offset yield stress for the non-melt extruded composite indicates a fairly linear stress-strain response up to a stress of 6,000 p.s.i.

Complementary tensile isochronous and tensile creep tests have been conducted on samples of this glass-fibre filled polypropylene before and after non-melt extrusion. The 100 second isochronous curves so produced are similar to constant straining rate tensile curves on the material. The graphs of total strain versus time for a range of stress levels (creep curves) show the extruded composite to exhibit dramatically lower strain for a given stress or time.

Finally, the impact strength both notched and unnotched of glass-fibre filled polyypropylene across the extrusion direction is substantially increased by use of the hydrostatic extrusion process.

EXAMPLE 2

Billets of glass-filled (40% by weight) polyacetal were machined from a 1″ diameter rod to give ideal extrusion ratios of 2:1 and 3:1 when extruded through an 0.3″ diameter circular die. These were hydrostatically extruded at 120° C. using a silicone oil (grade F111/300). The included angle of the die was 30°. A tensile force of about 40 pounds per square inch was applied to the extrudate, as it emerged from the die orifice. For comparison a sample of unfilled acetal was extruded at an ideal ratio of 3:1 under the same conditions. The product was tested as described in Example 1. Results were as follows.

| Mechanical parameter | Glass-fibre filled | | Unfilled |
|---|---|---|---|
| Ideal extrusion ratio | 2:1 | 3:1 | 3:1 |
| Steady extrusion pressure (p.s.i.) | 7,600 | 13,200 | 9,200 |
| Extrusion velocity (in. per min.) | 4.5 | 4 | 4 |
| Extrudate diameter (in.) | 0.309 | 0.3085 | 0.3235 |
| Actual extrusion ratio | 1.86:1 | 2.83:1 | 2.58:1 |
| Tensile modulus (secant at 0.2% strain) (p.s.i.$\times 10^6$) | 1.046 | 1.280 | 0.507 |
| Yield stress (0.1% strain offset (lb./sq. in.) | 5,830 | 7,300 | 4,760 |

EXAMPLE 3

Billets of glass-fibre filled (33% by weight) nylon 66 were prepared to give ideal extrusion ratios of 2:1 and 3:1, when extruded through a 0.3″ diameter die, the die angle being 30°. These were hydrostatically extruded at 180° C. A tensile force of about 20 pounds per square inch was applied to the extrudate. The product was tested as described in Example 1 and for comparison similar specimens of the same material were also tested, both the unextruded glass-filled material and the unextruded unfilled material. Results were as follows.

| Mechanical parameter | Extruded (Ideal extrusion ratio) | | Unextruded | |
|---|---|---|---|---|
| | 2:1 | 3:1 | Filled | Unfilled |
| Steady extrusion pressure (p.s.i.) | 6,780 | 11,020 | | |
| Extrusion velocity (in. per min.) | 4 | 4.5 | | |
| Extrudate diameter (in.) | 0.3064 | 0.2053 | *0.3 | *0.3 |
| Actual extrusion ratio | 1.9:1 | 2.9:1 | | |
| Tensile modulus (secant at 0.2% strain) (p.s.i.×10⁶) | 0.96 | 1.18 | 0.841 | 0.595 |
| Yield stress (0.1% strain offset) (p.s.i.) | 6,970 | 7,670 | 7,130 | 6,870 |
| Break stress (p.s.i.) | 18,520 | 23,000 | 11,500 | 11,575 |
| Break strain (percent) | 9.5 | 9 | 2.25 | 2.5 |

*Size of specimen tested.

EXAMPLE 4

The procedure of Example 3 was repeated using mica-filled nylon 66. (25% by weight). Results were similar to those obtained with glass-fibre, though less difference in process parameters was noted between extrusion ratios of 2:1 and 3:1. The principal differences in product properties were as follows

| Mechanical parameter | Ideal extrusion ratio | |
|---|---|---|
| | 2:1 | 3:1 |
| Tensile modulus* | 1.443 | 1.29 |
| Yield stress* | 7,450 | 7,840 |
| Fracture stress* | 13,800 | 13,400 |
| Fracture strain* | 3 | 3 |

*Method of measurement and units in this and subsequent tables are as indicated in Examples 1 to 3.

EXAMPLE 5

Billets of polypropylene containing varying proportions of steel fibres were melt formed and hydrostatically extruded through a 0.3″ diameter die at ideal extrusion ratios of 6:1 and at a temperature of 100° C. Results were as follows.

| | | | | |
|---|---|---|---|---|
| Steel fibre concentration (percent wt.) | 0 | 18.3 | 29.4 | 39.2 |
| Steel fibre concentration (percent vol.) | 0 | 2.5 | 4.4 | 6.2 |
| Density (g./cc.) | | 1.078 | 1.22 | 1.4 |
| Tensile modulus | 0.32 | 0.75 | 1.22 | 1.46 |
| Yield stress | 1,610 | 3,150 | 4,570 | 4,300 |
| Fracture stress | 29,400 | 18,400 | 18,820 | 15,430 |
| Fracture strain | 31 | 7.5 | 5.5 | 4.5 |
| Actual deformation ratio | 4.8:1 | 5.65:1 | 5.71:1 | 5.69:1 |

Specimens of polypropylene containing steel fibres produced as described above were examined by optical microscopy. Virtually complete orientation of the fibres was observed in the direction of the extrusion axis. This is illustrated by FIG. 1 which is a photo micrograph of a section through such a specimen at a magnification of about 25×. The extrusion axis is parallel with the horizontal axis of the photograph.

EXAMPLE 6

Glass-fibre filled polypropylene was hydrostatically extruded at varying ideal extrusion ratios and tensile tests were carried out on the products. For comparison purposes, similar tests were carried out on specimens prepared from unextruded samples of polypropylene, both filled and unfilled. Process conditions were as follows:

Hydrostatic fluid: silicone oil F111/300
Die: 0.3 inch diameter, 30° included angle
Tensile force applied to extrudate: 20 pounds per square inch.

| Mechanical parameter | Extruded (Ideal extrusion ratio) | | | Unextruded | |
|---|---|---|---|---|---|
| | 5:1 | 5.5:1 | ¹6:1 | Unfilled | Filled |
| Steady extrusion pressure (p.s.i.) | 10,800 | 11,500 | 8,800 | | |
| Extrusion temperature (° C.) | 100 | 100 | 126 | | |
| Extrusion velocity (in. per min.) | 12 | 45 | 12 | | |
| Extrudate diameter (in.) | 0.310 | 0.306 | 0.320 | ²0.3 | ²0.3 |
| Actual extrusion ratio | 4.7:1 | 5.24:1 | 5.26:1 | | |
| Tensile modulus | 1.07 | 1.23 | 1.05 | 0.21 | 0.41 |
| Yield stress | 5,000 | 5,880 | | 1,460 | 2,080 |
| Break stress | 19,100 | 18,700 | 13,250 | 3,160 | 4,180 |
| Break strain | 15.7 | 9 | 6 | >200 | 3 |

¹ Some voids were noted in the product, and some difficulty was experienced in obtaining a satisfactory extrudate.
² Size of specimen actually tested.

EXAMPLE 7

Glass-fibre filled polypropylene was extruded under the conditions of Example 6, except that the ideal extrusion ratio was 4.5:1 and the extrusion velocity was increased to 52 inches per minute.

Satisfactory extrusion was obtained. The tensile modulus of the extrudate was 0.93×10⁶ pounds per square inch and the yield stress was 4,430 pounds per square inch.

EXAMPLE 8

The effect of extrusion temperature was investigated by hydrostatically extruding glass-fibre filled polypropylene at varying temperatures.

Process conditions were otherwise as for Example 6. The ideal extrusion ratio was fixed at 5.5:1.

Results were as follows:

| | | | |
|---|---|---|---|
| Extrusion temperature, ° C. | 100 | 120 | 140 |
| Steady extrusion pressure (p.s.i.) | 12,550 | 7,800 | 3,700 |
| Extrusion velocity (in. per min.) | 4.5 | 4.5 | 4.5 |
| Extrudate diameter (in.) | 0.308 | 0.308 | 0.311 |
| Actual extrusion ratio | 5.29:1 | 5.22:1 | 5.11:1 |
| Tensile modulus | 1.23 | 1.17 | 1.09 |
| Yield stress | 5,880 | 4,670 | 4,220 |
| Break stress | 18,700 | 21,450 | 21,330 |
| Break strain | 9 | 12 | 15 |

It will be seen that tensile modulus and yield stress is highest and relaxation is at a minimum when extrusion is carried out at 100° C. However, use of higher temperatures permits the use of lower extrusion pressures.

EXAMPLE 9

Polypropylene, filled with mica (7.7% by volume) was extruded at varying extrusion ratios and the products were subjected to the usual tests. Comparative tests were carried out on specimens of the unextruded material of the same dimensions. Process conditions were as follows:

Hydrostatic fluid: silicone oil F111/300
Die: 0.3 inch diameter, 30° included angle
Tensile force applied to extrudate: 20 pounds per square inch
Temperature of extrusion: 100° C.
Extrusion velocity: 3–5 inches per minute.

Results were as follows:

| | Ideal extrusion ratio | | | | | | |
|---|---|---|---|---|---|---|---|
| | ¹1:1 | 2:1 | 3:1 | 4:1 | 5:1 | 5.5:1 | 6:1 |
| Steady extrusion pressure (p.s.i.) | | 3,000 | 5,340 | 7,000 | 10,000 | 13,000 | 13,200 |
| Extrusion velocity (in./min.) | | 5 | 4.5 | 4 | 3.5 | 3.5 | 2.75 |
| Extrudate diameter (in.) | ²0.3 | 0.322 | 0.322 | 0.318 | 0.315 | 0.311 | 0.311 |
| Actual extrusion ratio | | 1.72:1 | 2.61:1 | 3.52:1 | 4.55:1 | 5.13:1 | 5.56:1 |
| Tensile modulus | 0.59 | 0.48 | 0.69 | 0.78 | 0.81 | | 0.99 |
| Yield stress | 1,920 | 1,545 | 2,030 | 2,280 | 2,550 | | 3,160 |
| Break stress | 3,420 | 4,720 | 7,710 | 8,960 | 13,830 | | 17,000 |
| Break strain | 2.5 | 12.8 | 15.8 | 10.0 | 12.5 | | 9.0 |

¹ Unextruded—average of 5 results, remainder average of 2 or 3 results.
² Size of specimen actually tested.

It will be noted that the tensile modulus and yield stress of the product extruded at a ratio of 2:1 are slightly worse than the unextruded material. Above 3:1 however considerable improvement is noted.

EXAMPLE 10

Specimens of mica-filled polypropylene were prepared for impact testing.

An extruded rod 0.45 inch in diameter was prepared by hydrostatically extruding a billet of the melt-formed material through a 0.435 inch diameter die at an ideal extrusion ratio of 4.27:1 under the conditions of Example 9. A similar sized specimen of unextruded material was prepared. Both specimens were provided with a 0.130 inch deep notch; the notch radius was 0.010 inch. The notched specimens were tested on a standard IZOD metals impact machine, at 23° C.

The unextruded specimen fractured at an energy so small that no reportable reading was obtained. The fracture was clean and brittle from the base of the notch across the specimen.

The extruded specimen fractured at an energy of 4.33 pounds per foot (same result obtained with three specimens). No clean fracture was obtained but the specimens bent over to 30° angle, allowing the test anvil to pass by.

EXAMPLE 11

Billets of polypropylene containing various fillers were prepared by blending the components followed by melt pressing. The following fillers were used; the letter in brackets after each is a coding used in the table of results below.

Asbestos fibre (A)
High modulus carbon fibre (C)
Graphite flakes (G)
Silicon carbide whiskers (S)

For comparative purposes the last column shows results for glass fibre (F) taken from Example 6.

Process conditions were as follows:

Die: size as indicated, 30° included angle
Hydrostatic fluid: silicone oil F111/300
Extrudate tension: 15–20 pounds per square inch
Extrusion temperature: 100° C.
Extrusion velocity: about 5 inches per minute Results were as follows:

| Filler | A | C | G | S | F |
|---|---|---|---|---|---|
| Filler concentration (percent by wt.) | 40 | 11.1 | 14.4 | 25.1 | 20 |
| Filler concentration (percent by vol.) | 12.6 | 5.3 | 7.05 | 8.75 | 8 |
| Ideal extrusion ratio | 4:1 | 5:1 | 5:1 | 6:1 | 5.5:1 |
| Die size (in.) | 0.435 | 0.3 | 0.3 | 0.3 | 0.3 |
| Steady extrusion pressure (p.s.i.) | 4,400 | 5,300 | 4,600 | 8,400 | 11,500 |
| Extrudate diameter (in.) | 0.461 | 0.311 | 0.324 | 0.311 | 0.306 |
| Actual extrusion ratio | 3.56:1 | 4.65:1 | 4.3:1 | 5.6:1 | 5.241 |
| Tensile modulus | 0.62 | 0.92 | 0.38 | 0.68 | 1.23 |
| Yield stress | 2,000 | 2,940 | 1,640 | 2,910 | 5,880 |
| Break stress | 5,830 | 13,500 | 11,400 | 17,100 | 18,700 |
| Break strain | 5.8 | 13 | 22 | 12 | 9 |

EXAMPLE 12

Figure 2:
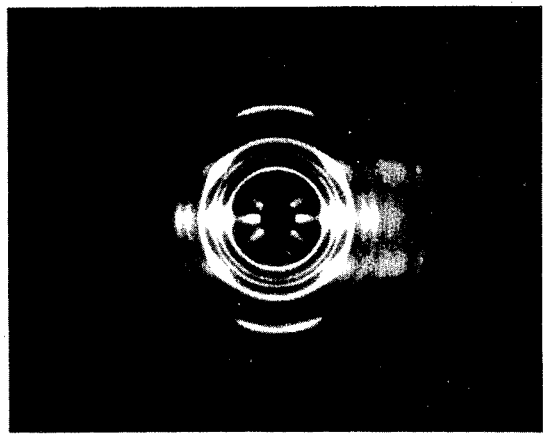
Figure 3:
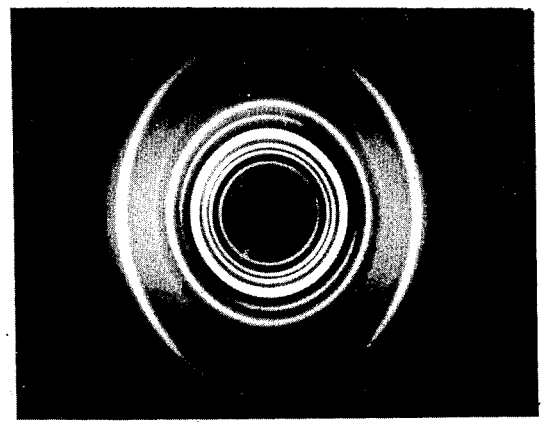

The procedure of Example 1 was repeated using 8% by volume glass-filled polypropylene. Sections were then cut, lengthwise, from the product and were examined by X-ray diffraction, the X-ray beams being passed through the centre of the specimen perpendicular to the plane of the section. At an ideal extrusion ratio of 5.5:1, the X-ray photograph revealed a high degree of molecular orientation of the matrix material in the direction of extrusion. This is clearly demonstrated (see FIG. 2) by the narrow area of the principal reflexions of polypropylene, notably the (110), (040) and (130) reflexions. FIG. 3, which consists of a similarly produced X-ray photograph of a longitudinal section from the unextruded composite, demonstrates the lack of orientation of the starting material.

What we claim is:
1. Process for producing articles of reinforced thermoplastic composite materials which comprises subjecting a void free billet of a substantially non-oriented mixture of filler and thermoplastic in which the filler is evenly distributed throughout a homogeneous thermoplastic matrix to a solid phase extrusion process at a temperature below the melting point of both matrix and filler to cause permanent deformation of the matrix and at least partial orientation of the matrix and filler in substantially the same direction or directions, said mixture and the extrusion temperature being selected from the group consisting of filled polypropylene solid phase extruded at an extrusion temperature from 90° to 140° C.; filled polyamides or filled polyesters solid phase extruded at an extrusion temperature from 100° to 200° C.; and filled polyaldehyde solid phase extruded at an extrusion temperature from 110° to 130° C. and the extrusion being carried out at an ideal extrusion ratio of 2:1 to 8:1.

2. Process according to claim 1 in which the solid phase extrusion process is hydrostatic extrusion.

3. Process according to claim 1 in which the blend comprises filled polypropylene and the extrusion temperature is in the range 90 to 110° C.

4. Process according to claim 3 in which the ideal extrusion ratio is from 4.5:1 to 6:1.

5. Process according to claim 4 in which the ideal extrusion ratio is about 5.5:1.

6. Process according to claim 1 in which the filled orientable thermoplastic polymer is selected from filled polyamides and filled polyester extruded at a temperature in the range 100 to 200° C.

7. Process according to claim 6 in which the ideal extrusion ratio is from 2:1 to 5:1.

8. Process according to claim 6 in which the polyamide is nylon 6.6.

9. Process according to claim 6 in which the polyester is polyethylene terephthalate.

10. Process according to claim 1 in which a filled polyaldehyde is extruded between 110 and 130° C.

11. Process according to claim 10 in which the polyaldehyde is polyacetal.

12. Process according to claim 1 in which the extrusion velocity is in the range 2 to 200 inches per minute.

13. Process according to claim 1 in which the surface layer of the extruded product is briefly heated to reduce the degree of orientation in the said layers.

References Cited

UNITED STATES PATENTS 3,507,941 4/1970 Kies _____ 264—323 X
3,239,881 3/1966 Larsen _____ 264—210 X
3,394,045 7/1968 Gould _____ 161—402 X ROBERT F. WHITE, Primary Examiner
T. P. PAVELKO, Assistant Examiner